(12) United States Patent  
Heor (10) Patent No.: US 7,804,747 B2  
(45) Date of Patent: Sep. 28, 2010

(54) OPTICAL PICKUP WHICH IS COMPATIBLE WITH MULTIPLE TYPES OF MEDIA

(75) Inventor: Tae-Youn Heor, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1352 days.

(21) Appl. No.: 11/272,799

(22) Filed: Nov. 15, 2005

(65) Prior Publication Data

US 2006/0181977 A1   Aug. 17, 2006

(30) Foreign Application Priority Data

Feb. 3, 2005 (KR) .................... 10-2005-0010066

(51) Int. Cl.
*G11B 7/00* (2006.01)
*G11B 7/135* (2006.01)
(52) U.S. Cl. ............. 369/44.37; 369/44.12; 369/112.01
(58) Field of Classification Search .............. 369/44.12, 369/112.01
See application file for complete search history.

(56) References Cited

U.S. PATENT DOCUMENTS

| 6,643,245 | B2 * | 11/2003 | Yamamoto et al. ..... 369/112.01 |
| 2003/0048715 | A1 * | 3/2003 | Kim et al. ............... 369/53.2 |
| 2004/0047269 | A1 * | 3/2004 | Ikenaka et al. ......... 369/112.08 |
| 2004/0165520 | A1 | 8/2004 | Heor et al. |
| 2004/0213131 | A1 * | 10/2004 | Kimura et al. ......... 369/112.03 |
| 2004/0264354 | A1 | 12/2004 | Hirayama |
| 2005/0007934 | A1 | 1/2005 | Ohta et al. |
| 2005/0018560 | A1 | 1/2005 | Kim et al. |
| 2005/0030878 | A1 | 2/2005 | Park et al. |
| 2006/0007812 | A1 * | 1/2006 | Nishi et al. ............... 369/44.37 |

FOREIGN PATENT DOCUMENTS

CN      1551151 A      12/2004

(Continued)

*Primary Examiner*—Wayne R Young
*Assistant Examiner*—Aneeta Yodichkas
(74) *Attorney, Agent, or Firm*—Roylance, Abrams, Berdo & Goodman, L.L.P.

(57) ABSTRACT

A compatible optical pickup can be used with advanced optical discs (AODs), blu-ray discs (BDs), digital versatile discs (DVDs), and compact discs (CDs). The compatible optical pickup comprises a first light source unit for independently projecting first and second short-wavelength laser beams which have different polarizations, a second light source unit for independently projecting first and second long-wavelength laser beams which have different wavelength-range, a first objective lens that has a high numerical aperture suitable for a high density optical information recording medium, a second objective lens that has a low numerical aperture suitable for a low density optical information recording medium, and a light path changing unit for guiding the first short-wavelength laser beams to the first objective lens and guiding the second short-wavelength laser beams, the first long-wavelength laser beams, and the second long-wavelength laser beams to the second objective lens. The first short laser beams of, for example, P-polarized light are for use with a BD, the second short-wavelength laser beams of, for example, S-polarized light, are for use with an AOD, the first long-wavelength laser beams are for use with a DVD, and the second long-wavelength laser beams are for use with a CD.

18 Claims, 4 Drawing Sheets

FOREIGN PATENT DOCUMENTS

| | | |
|---|---|---|
| EP | 1 615 212 | 1/2006 |
| JP | 2002-197717 | 7/2002 |
| KR | 2001-055361 | 7/2001 |
| KR | 2003-081292 | 10/2003 |
| KR | 2003-095346 | 12/2003 |
| KR | 2004-021324 | 3/2004 |
| KR | 2005-0005237 | 1/2005 |

\* cited by examiner

OPTICAL PICKUP WHICH IS COMPATIBLE WITH MULTIPLE TYPES OF MEDIA

CROSS-REFERENCE TO RELATED APPLICATIONS

This application claims the benefit under 35 U.S.C. §119 (a) of Korean Patent Application No. 2005-10066, filed Feb. 3, 2005, in the Korean Intellectual Property Office, the entire disclosure of which is hereby incorporated by reference.

BACKGROUND OF THE INVENTION

1. Field of the Invention

The present invention relates to an optical pickup for an optical recording/reproducing apparatus. More particularly, the present invention relates to an optical pickup that is capable of recording and/or reproducing information on various kinds of optical information recording mediums, such as compact discs (CDs), digital versatile discs (DVDs), advanced optical discs (AODs), blue-ray discs (BDs), and the like.

2. Description of the Related Art

Recently, short-wavelength red lasers have found a practical use in DVDs, which have a recording capacity substantially equal to or higher than that of CDs, and have come into widespread use.

A CD is an optical information recording medium that is adapted to record and/or reproduce information using light having a wavelength of 780 nm and an objective lens having a numerical aperture of 0.45 or 0.5. A DVD is an optical information recording medium adapted to record and/or reproduce information using light having a wavelength of 650 nm and an objective lens having a numerical aperture of 0.6 or 0.65. A DVD has a recording capacity of about 4.7 GB. A DVD can be called a high density optical information recording medium, as compared to a CD that has a recording capacity of about 0.65 GB.

As blue lasers that generate and project short-wavelength laser beams of about 400 nm have come into use, optical information recording mediums that allow the recording of information at a higher density have appeared. An AOD (Advanced Optical Disc), which is also called a next generation High-Definition DVD (HD-DVD), is an optical information recording medium that records and/or reproduces information using light having a wavelength of 405 nm and an objective lens having a numerical aperture which is the same as that used in a DVD. Such an AOD has a higher recording density as compared to a DVD because it uses short-wavelength light. In addition, it has an advantage over Blue-ray Disc (BD) technology because it uses an objective lens with the same NA as that used in a DVD, which provides a compatibility advantage.

A BD is an optical information recording medium that is adapted to record and/or reproduce information using light having a wavelength of 405 nm and an objective lens having a numerical aperture of 0.85, wherein the BD has a high recording density of about 25 GB. Recently, diverse research and development is being conducted on such a BD, which has been proposed as a high density optical information recording medium suitable for recording high definition moving image information.

As various types of high density optical recording mediums have been developed as described above, optical pickups have been developed which are compatible with both high density optical recording mediums and low density optical recording mediums. For convenience, the term "compatible optical pickup" will be used to refer to an optical pickup which is compatible with more than one type of recording medium.

Conventional compatible optical pickups typically employ two or three light sources to generate and project short-wavelength (405 nm) laser beams for use in a high density optical information recording medium and long-wavelength (655 nm and 785 nm) laser beams for use in a low density optical information recording medium, and two objective lenses each for use in a high density optical information recording medium and a low density optical information recording medium.

Such conventional compatible optical pickups may be compatible with a CD, a DVD and one of an AOD or a BD. An optical pickup, which is compatible with all four types of optical recording mediums, that is, AOD, BD, DVD and CD, has not yet been made available.

Accordingly, there is a need for a compatible optical pickup which is compatible with all of an AOD, a BD, a DVD and a CD.

SUMMARY OF THE INVENTION

An aspect of the present invention is to address at least the above problems and/or disadvantages and to provide at least the advantages described below. Accordingly, an aspect of the present invention is to provide a compatible optical pickup which is compatible for all of an AOD, a BD, a DVD and a CD.

Another aspect of the present invention is to provide a compatible optical pickup which can record and/or reproduce information with all of an AOD, a BD, a DVD and a CD using two light sources and two objective lenses and which is simple in construction.

In accordance with an aspect of the present invention, a compatible optical pickup comprises a first light source unit that independently projects first and second short-wavelength laser beams, and the polarization states of the first and second short-wavelength laser beams are different from each other. A second light source unit independently projects first and second long-wavelength laser beams, and the wavelength-range states of the first and second long-wavelength laser beams are different from each other. A first objective lens has a high numerical aperture suitable for a high density optical information recording medium. A second objective lens has a low numerical aperture suitable for a low density optical information recording medium. A light path changing unit guides the first short-wavelength laser beams to the first objective lens and guides the second short-wavelength laser beams, the first long-wavelength laser beams, and the second long-wavelength laser beams to the second objective lens.

The first light source unit may comprise a twin blue laser diode in which a first blue laser diode for projecting first short-wavelength laser beams of P-polarized light and a second blue laser diode for projecting second short-wavelength laser beams of S-polarized light are packaged as a single component.

The first and second blue laser diodes may be arranged to have different angles with respect to the direction of an optical axis. Preferably, the first and second blue laser diodes may be arranged at an angle of 90 degrees or 45 degrees.

The second light source unit may comprise a twin laser diode in which a first laser diode for projecting the first long-wavelength laser beams and a second laser diode for projecting the second long-wavelength laser beams are packaged as a single component. More preferably, the second light source unit is configured as a hologram module with an integral photodiode as an optical detector.

According to an exemplary embodiment of the present invention, the light path changing unit comprises a beam splitter that splits the short-wavelength laser beams projected from the first light source unit by reflecting and transmitting the short-wavelength laser beams, and transmitting the laser beams reflected from an optical information recording medium. A first collimating lens focuses the laser beams reflected by the beam splitter into parallel beams, and a second collimating lens focuses the long-wavelength laser beams projected from the second light source unit into parallel beams. A polarized light beam splitter transmits the P-polarized light and reflects the S-polarized light in the laser beams focused by the first collimating lens, so that the laser beams of S-polarized light are incident on the second objective lens. The polarized light beam splitter transmits the long-wavelength laser beams focused by the second collimating lens, so that long-wavelength laser beams are incident on the second objective lens. A reflecting mirror changes the path of the laser beams of P-polarized light transmitted through the polarized light beam splitter toward the first objective lens.

In addition, the compatible optical pickup may further comprise first and second grating lenses for splitting the laser beams projected from the first and second light source units into main beams and sub beams and/or an optical detection unit for receiving light reflected from an optical information recording medium and outputting a disc information reproducing signal and signals for focusing and tracking.

The optical detection unit may further comprise a first photodiode for receiving light reflected from the high density optical information recording medium, and a second photodiode for receiving light reflected from the low density optical information recording medium.

The second grating lens and the second photodiode may be integrally formed with the second light source unit, and the second light source unit may include a holographic optical device that diffracts the light reflected from the low density optical information recording medium to the second photodiode.

The compatible optical pickup may further comprise a third photodiode that receives light projected from the first light source unit and transmitted through the beam splitter and outputs a signal for tuning the intensity of laser beams.

According to another exemplary embodiment of the present invention, the light path changing unit comprises a first polarized light beam splitter having an S-polarized light reflecting plate which transmits the P-polarized light and reflects the S-polarized light in the short-wavelength laser beams projected from the first light source unit, and a P-polarized light reflecting plate which transmits S-polarized light and reflects P-polarized light, so that the S-polarized light is incident on the second objective lens and the first and second long-wavelength laser beams projected from the second light source unit are also incident on the second objective lens. A second polarized light beam splitter has a P-polarized light reflecting plate for making the P-polarized light, which has been transmitted through the first polarized light beam splitter, incident on the first objective lens, and an S-polarized light reflecting plate which transmits the P-polarized light and reflects the S-polarized light. First and second collimating lenses are arranged between the first polarized light beam splitter and the second objective lens, and between the second polarized light beam splitter and the first objective lens, respectively, to collimate incident light. First and second wavelength plates are arranged between the first collimating lens and the second objective lens, and between the second collimating lens and the first objective lens, respectively, to transform the polarized lights of the short-wavelength laser beams respectively reflected from the optical information recording medium.

The numerical aperture of the first objective lens employed in the compatible optical pickup is preferably not less than 0.85 and the numerical aperture of the second objective lens is preferably not more than 0.65.

In addition, the short-wavelength is preferably in the 400 nm-wavelength range, the first long-wavelength is preferably in the 650 nm-wavelength range, and the second long-wavelength is preferably in the 780 nm-wavelength range. Even more preferably, the short-wavelength is 405 nm, the first long-wavelength is 655 nm, and the second long-wavelength is 785 nm.

The optical information recording mediums for recording and/or reproducing information in the inventive compatible optical pickup include a BD which is a high density recording medium, and an AOD, a DVD, and a CD, which are relatively low density recording mediums.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the exemplary embodiments of the invention. Accordingly, those of ordinary skill in the art will recognize that various changes and modifications of the exemplary embodiments described herein can be made without departing from the scope and spirit of the invention. Also, descriptions of well-known functions and constructions are omitted for clarity and conciseness.

Figure 1:
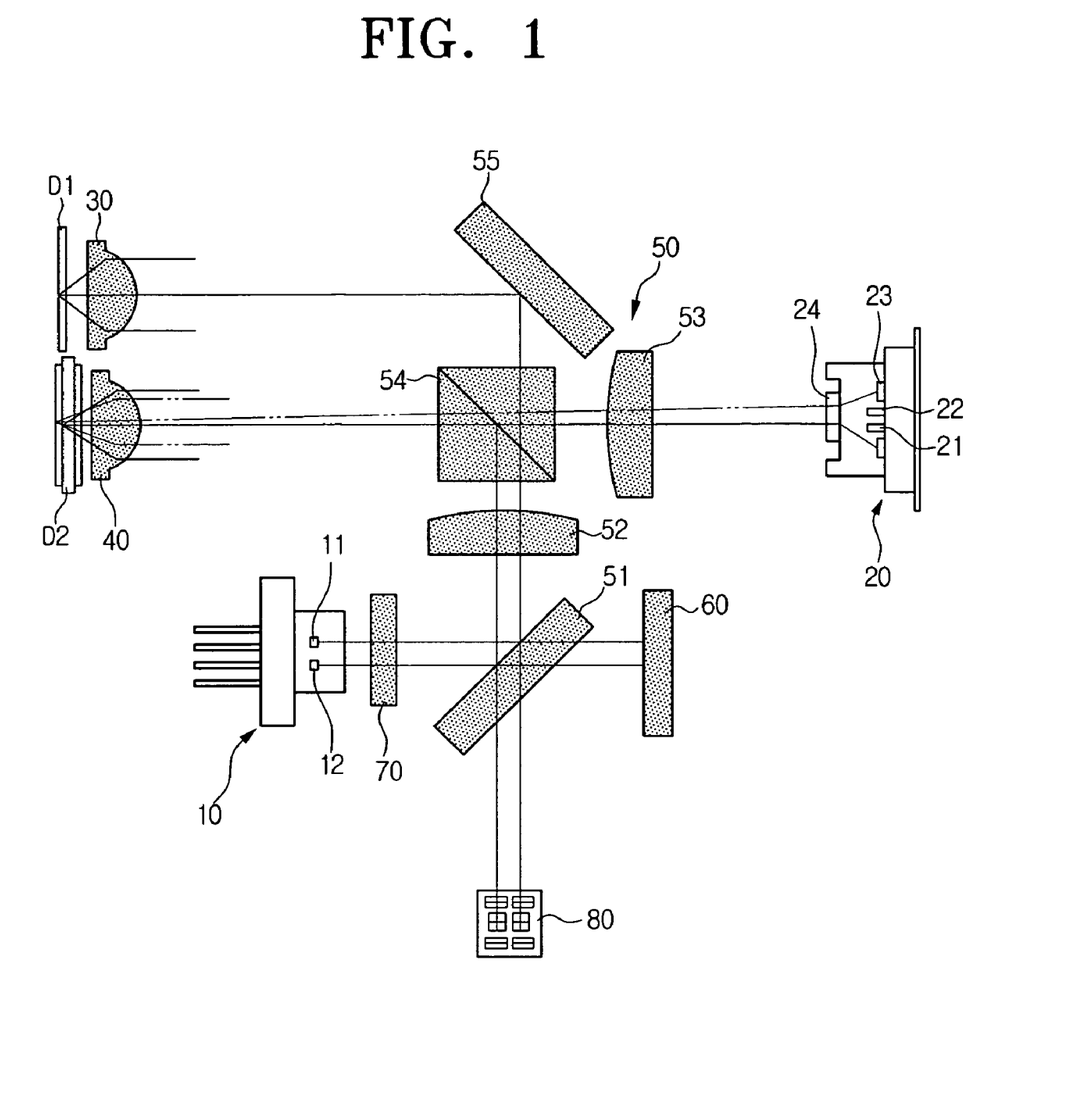
FIG. 1 schematically shows a compatible optical pickup according to a first exemplary embodiment of the present invention.

Referring to FIG. 1, a first light source unit 10 generates and projects first and second short-wavelength laser beams. The polarization of the first and second short-wavelength laser beams are different from each other. The first light source unit is a component of the exemplary embodiments of the present invention. The first light source unit 10 includes a twin blue laser diode in which a first blue laser diode 11 that projects first short-wavelength laser beams of P-polarized light and a second blue laser diode 12 that projects second short-wavelength laser beams of S-polarized light are packaged as a single component. Here, the short-wavelength is in the 400 nm wavelength range and, in particular, the short-wavelength is 405 nm suitable for a high density optical information recording medium.

Figure 2A:
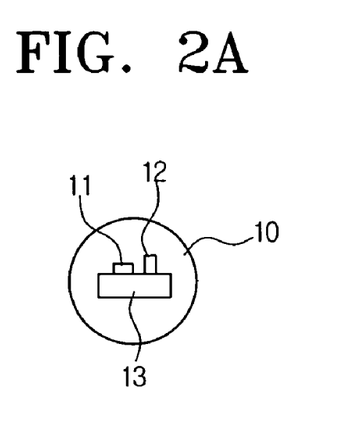
FIGS. 2A, 2B and 2C show various exemplary embodiments for a first light source unit for generating and projecting short-wavelength laser beams of different polarized lights, in which the light source unit is a component of the exemplary embodiments of the present invention.
Figure 2B:
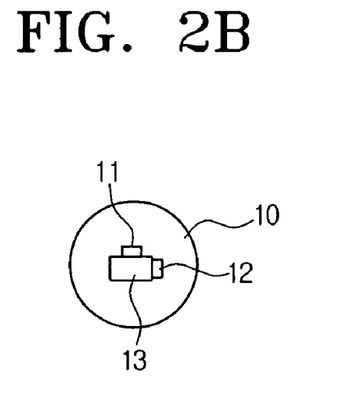
Figure 2C:
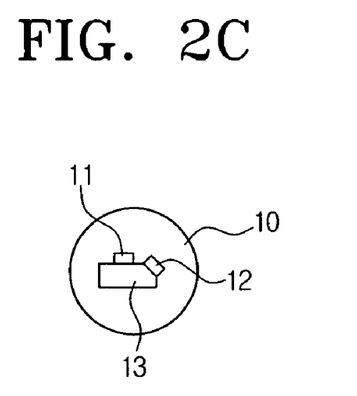

The first and second blue laser diodes 11 and 12 are arranged at different angles in relation to the direction of an optical axis, as shown in FIGS. 2A, 2B and 2C, so that the polarized lights of the short-wavelength laser beams projected from the respective laser diodes 11, 12 are different from each other. The first and second blue laser diodes 11 and 12 are arranged on a substrate 13, and may be arranged at an angle of approximately 90 degrees or approximately 45 degrees. In the following description, the first short-wavelength laser beams of P-polarized light are used for a BD and the second short-wavelength laser beams of S-polarized light are used for an AOD. However, the reverse relation is also possible.

A second light source unit 20 generates and projects first and second long-wavelength laser beams. The second light source unit 20 comprises a twin laser diode in which a first laser diode 21 that generates laser beams in the 650 nm-wavelength range for use with a DVD and a second laser diode 22 that generates and projects laser beams in the 780 nm-wavelength range for use with a CD are packaged as a single component as in the first light source unit 10. Preferably, the first and second long-wavelength laser beams are 655 nm and 785 nm, respectively.

The second light source unit 20 integrally includes a second photodiode 23 as an optical detection unit. The optical detection unit receives light reflected from an optical information recording medium and outputs an information reproducing signal and signals for focusing and tracking. In addition, the second light source unit 20 includes a holographic optical device 24 for diffracting light reflected from the optical information recording medium to the second photodiode 23. Furthermore, a grating lens or the like may be integrally incorporated in the second light source unit 20. These optical components are called a hologram module or a hologram unit.

The compatible optical pickup apparatus includes a first objective lens 30 and a second objective lens 40. The first objective lens 30 has a high numerical aperture suitable for a high density optical information recording medium. Here, the high density optical information recording medium may be an optical disc such as a BD having a thickness of about 0.1 mm. In addition, the numeral aperture of the first objective lens 30 is preferably not less than 0.85.

The second objective lens 40 has a low numerical aperture suitable for a low density optical information recording medium. Such a low density optical information recording medium is any one of a DVD, a CD, or an AOD (which has a density higher than a DVD). In the drawing, the three optical discs are referred to with the symbol D2. The second objective lens 40 preferably has a numerical aperture of not more than 0.65 so that it is possible to record and/or reproduce information compatibly for these three types of optical discs, wherein the second objective lens 40 is suitable for an optical disc having a thickness of not less than about 0.6 mm.

The first objective lens 30 and the second objective lens 40 are supported by a blade and driven in tracking and focusing directions by an actuator, which is not shown in the drawing.

Meanwhile, a light path changing unit 50 guides the first short-wavelength laser beams projected from the first light source unit 10 toward the first objective lens 30 and guides the second short-wavelength laser beams projected from the first light source unit 10 and the first and second long-wavelength laser beams projected from the second light source unit 20 toward the second objective lens 40. By the light path changing unit 50, the laser beams suitable for an optical information recording medium desired to be used are incident on a corresponding objective lens.

The above-mentioned light path changing unit 50 includes a beam splitter 51, a first collimating lens 52, a second collimating lens 53, a polarized light beam splitter 54, and a reflecting mirror 55.

The beam splitter 51 is arranged on an axis of the laser beam of the first light source unit 10 to be tilted at an angle of about 45 degrees and splits the laser beams projected from the first light source unit 10 by transmitting or reflecting the laser beams. That is, the majority of the laser beams projected from the first light source unit 10 are reflected by the beam splitter 51 toward the objective lens, but a part of the laser beams are transmitted through the beam splitter 51 and are incident on a third photodiode 60. The third photodiode 60 receives laser beams transmitted through the beam splitter 51 and outputs a signal for tuning the optical intensity of the laser beams. By this, the intensity of the laser beams projected from the first light source unit 10 can be maintained at a desired level.

The first collimating lens 52 is arranged to focus the laser beams reflected by the beam splitter 51 into parallel beams, and the second collimating lens 53 is arranged to focus the long-wavelength laser beams projected from the second light source unit 20 into parallel beams. Due to these collimating lenses 52 and 53, the parallel beams are incident on the respective objective lenses 30 and 40.

The polarized light beam splitter 54 changes the light path in such a way that the laser beams projected from the first light source unit 10 and the second light source unit 20 are incident on a corresponding objective lens 30 or 40. For example, the polarized light beam splitter 54 transmits a part of the short-wavelength laser beams of P-polarized light while reflecting the short-wavelength laser beams of S-polarized light in the laser beams focused by the first collimating lens 52, so that the short-wavelength laser beams of S-polarized light are incident on the second objective lens 40. In addition, the polarized light beam splitter 54 transmits the long-wavelength laser beams focused by the second collimating lens 53, so that the laser beams are incident on the second objective lens 40. Therefore, the short-wavelength laser beams of S-polarized light projected from the first light source unit 10 and the first and second long-wavelength laser beams projected from the second light source unit 20 can be focused on the low density optical information recording medium D2 by the second objective lens 40. Here, the short-wavelength laser beams of S-polarized light are for use with AODs and the first and second long-wavelength laser beams are for use with DVDs and CDs.

The reflecting mirror 55 reflects the short-wavelength laser beams of P-polarized light transmitted through the polarized light beam splitter 54 so that the laser beams are incident on the first objective lens 30. As a result, the short-wavelength laser beams of P-polarized light can be focused on the high density optical information recording medium D1 by the first objective lens 30.

A grating lens 70 splits the laser beams projected from the first light source unit 10 into main beams and sub-beams. The laser beams split into the main beams and sub-beams by the grating lens 70 are incident on an optical information recording medium and then reflected, and transmitted through the beam splitter 51 to be incident on the first photodiode 80. The first photodiode 80 receives the laser beams, detects an information signal, an error signal, and the like, and outputs a reproducing signal and signals for focusing and tracking.

In addition, although not shown in the drawing, a second grating lens is preferably integrally formed with the second light source unit 20 for splitting the long-wavelength laser beams projected from the second light source unit 20 into main beams and sub-beams.

The compatible optical pickup configured as described above according to the first exemplary embodiment of the present invention optically functions as follows.

At first, when a BD is used, short-wavelength laser beams of P-polarized light are projected from the first blue laser diode 11 of the first light source unit 10. The laser beams are reflected by the beam splitter 51, focused into parallel beams in the first collimating lens 52, then transmitted through the polarized light beam splitter 54, and incident on the first objective lens 30 by the reflecting mirror 55. As the laser beams are focused on the BD by the first objective lens 30, information is reproduced and/or recorded.

Next, when an AOD is used, short-wavelength laser beams of S-polarized light are projected from the second blue laser diode 12 of the first light source unit 10. The laser beams are reflected by the beam splitter 51, focused into parallel beams in the first collimating lens 52, then reflected by the polarized light beam splitter 54, and incident on the second objective lens 40. As the laser beams are focused on the AOD by the second objective lens 40, information is reproduced and/or recorded.

During the above-mentioned procedure, the laser beams projected from the first light source unit 10 are split into main beams and sub-beams by the first grating lens 70, and a part of the laser beams are transmitted through the beam splitter 51 and incident on the third photodiode 60. In addition, laser beams reflected from each optical information recording medium are incident on the first photodiode 80 by way of the light path changing unit 50 by the final beam splitter 51.

Meanwhile, if a DVD or CD is used, corresponding long-wavelength laser beams are projected from the second light source unit 20. The projected laser beams are focused into parallel beams by the second collimating lens 53, then transmitted through the polarized light beam splitter 54 to be incident on the second objective lens 40, and focused on the DVD or CD by the objective lens 40. Here, the laser beams projected from the second light source unit 20 are also split into main beams and sub-beams by a grating lens (not shown) to be incident on a corresponding optical information recording medium. Then, the laser beams reflected from the optical information recording medium are diffracted by the holographic optical device 24 and incident on the second photodiode 23.

Thus, with this construction, the compatible optical pickup allows recording and/or reproducing of information for all of an AOD, a DVD, a CD and a BD with a relatively simple construction that uses two light source units and two objective lenses.

Figure 3:
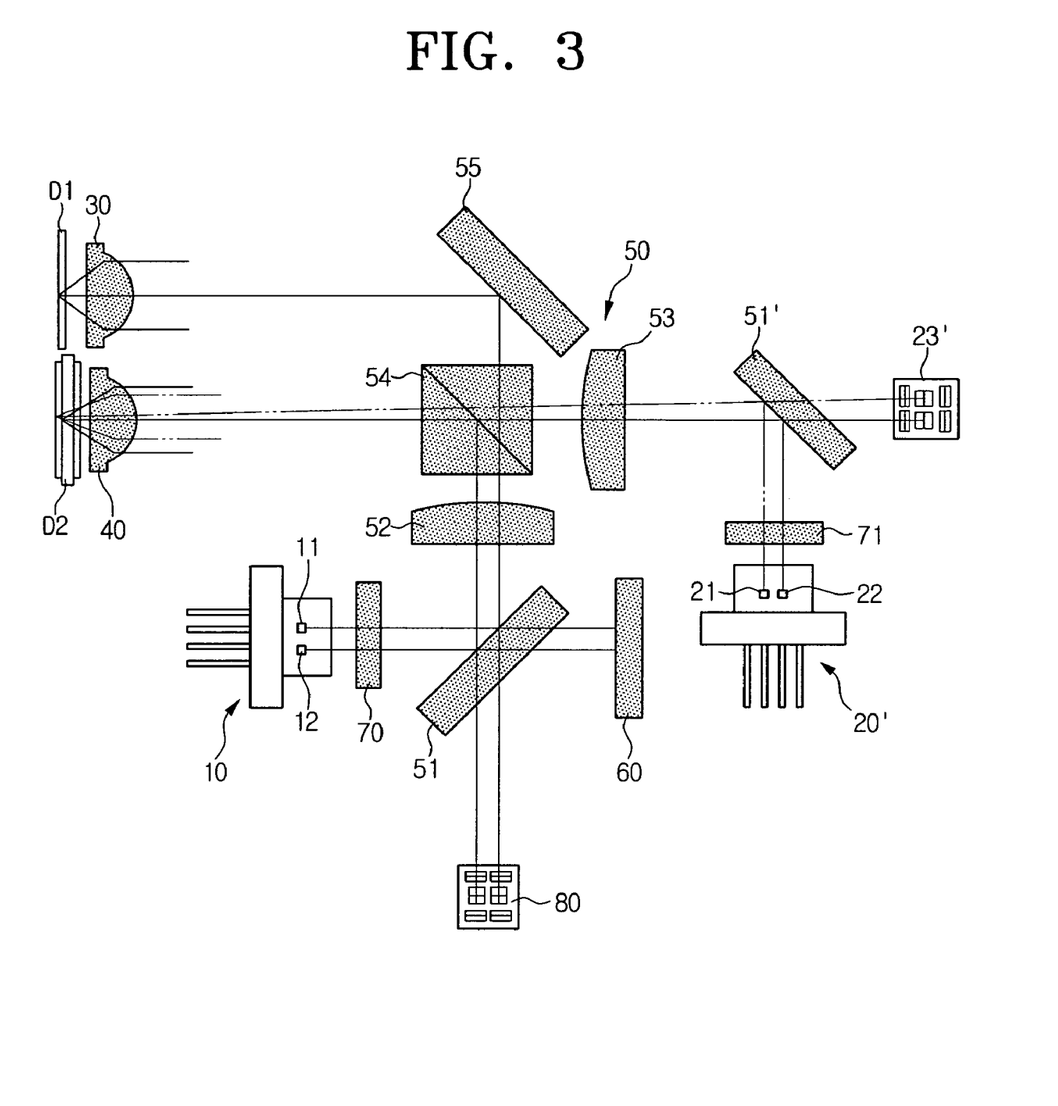
FIG. 3 shows a compatible optical pickup according to a second exemplary embodiment of the present invention.

FIG. 3 schematically shows a compatible optical pickup according to a second exemplary embodiment of the present invention.

As shown in the drawing, the compatible optical pickup according to the second exemplary embodiment of the present invention is similar to that of the first exemplary embodiment, except that the second light source unit 20' and the second photodiode 23' are separated. More specifically, the second light source unit 20' only includes the first and second laser diodes 21 and 22 and the second photodiode 23' is separated from the second light source unit 20'. A second grating lens 71 for splitting laser beams into main beams and sub-beams is arranged in front of the second light source unit 20' and a second beam splitter 51' is arranged in the optical axis.

According to the second exemplary embodiment of the present invention, the long-wavelength laser beams projected from the second light source unit 20' are split into main beams and sub-beams by the second grating lens 71, then reflected by the second beam splitter 51' to be incident on the second objective lens 40, and focused on an optical information recording medium by the second objective lens 40. Meanwhile, the beams reflected from the optical information recording medium D2 are incident on the second photodiode 23' by the second beam splitter 51', whereby a reproducing signal and signals for focusing and tracking are output from the second photodiode 23'. The other constructions and functions are substantially identical to those of the first exemplary embodiment described above. Therefore, like components are identified by the same reference numerals used for the first exemplary embodiment and a detailed description is not repeated.

Figure 4:
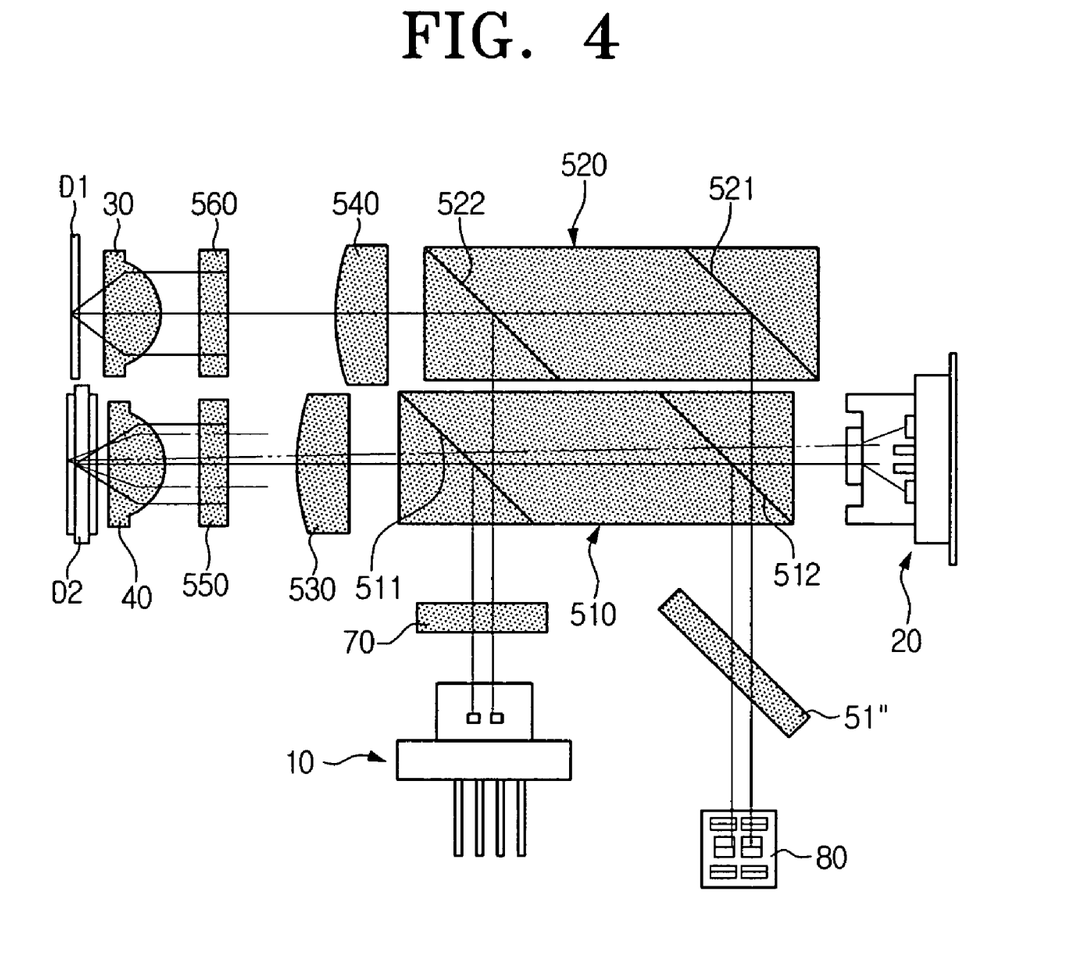
FIG. 4 shows a compatible optical pickup according to a third exemplary embodiment of the present invention.

FIG. 4 schematically shows a compatible optical pickup according to a third exemplary embodiment of the present invention. As shown in the drawing, the light path changing unit 500 is different from those of the first and second exemplary embodiments above.

That is, the light path changing unit 500 comprises first and second polarized light beam splitters 510 and 520, first and second collimating lenses 530 and 540, and first and second wavelength plates 550 and 560.

The first polarized light beam splitter 510 comprises an S-polarized light reflecting plate 511 for transmitting the short-wavelength laser beams of P-polarized light projected from the first light source unit 10 and reflecting the short-wavelength laser beams of S-polarized light, and a P-polarized light reflecting plate 512 for reflecting short-wavelength laser beams of P-polarized light and transmitting short-wavelength laser beams of S-polarized light. The S-polarized light-reflecting plate 511 and the P-polarized light reflecting plate 512 are positioned one after another with respect to the optical axis. As a result, the laser beams of S-polarized light projected from the first light source unit 10 are reflected by the S-polarized light reflecting plate 511 of the first polarized light beam splitter 510 to be incident on the second objective lens 40.

Meanwhile, the S-polarized light reflecting plate 511 and the P-polarized light reflecting plate 512 both transmit the first and second long-wavelength laser beams projected from the second light source unit 20. Therefore, the first and second long-wavelength laser beams respectively projected from the second light source unit 20 are incident on the second objective lens 40.

In addition, the second polarized light beam splitter 520 comprises an S-polarized light beam splitter 521 and a P-polarized light reflecting plate, which are identical to those of the first polarized light beam splitter 510 in construction but are arranged opposite to the first polarized light beam splitter 510. Therefore, the P-polarized light transmitted through the S-polarized reflecting plate 511 of the first polarized light beam splitter 510 is reflected by the P-polarized reflecting plate 522 of the second polarized light beam splitter 520 to be incident on the first objective lens 30.

The first and second collimating lenses 530 and 540 are arranged between the first polarized light beam splitter 510 and the second objective lens 40 and between the second polarized light beam splitter 520 and the first objective lens 30, respectively, to collimate incident light. As a result, parallel beams are respectively incident on the first and second objective lenses 30 and 40.

In addition, the first and second wavelength plates 550 and 560 are arranged between the first collimating lens 550 and the second objective lens 40, and between the second collimating lens 560 and the first objective lens 30, respectively, thereby transforming the polarized light of short-wavelength laser beams reflected from an optical information recording medium.

Therefore, the short-wavelength laser beams of S-polarized light, which have been reflected by the S-polarized light reflecting plate 511 of the first polarized light beam splitter 510 and are incident on the optical information recording medium D2, are transformed into P-polarized light when they are reflected from the optical information recording medium and come out via the first wavelength plate 550, and the laser beams of P-polarized light transformed in this manner are transmitted through the S-polarized reflecting plate 511 of the first polarized light splitter 510 and reflected by the P-polarized reflecting plate 512 behind the S-polarized reflecting plate 511, whereby the laser beams of P-polarized light laser beams are incident on the first photodiode 80 via the third beam splitter 51".

Meanwhile, the short-wavelength laser beams of P-polarized light, which have been transmitted through the S-polarized reflecting plate 511 of the first polarized light beam splitter 510, are reflected by the P-polarized reflecting plate 522 of the second polarized light beam splitter 520 and incident on the optical information recording medium D1. The short-wavelength laser beams of P-polarized light are transformed into S-polarized light when being reflected by the optical information recording medium D1 and passing the second wavelength plate 560, and the laser beams of S-polarized light transformed in this manner are transmitted through the P-polarized light reflecting plate 522 of the second polarized light beam splitter 520 and reflected by the S-polarized light reflecting plate 521 behind the P-polarized light reflecting plate 522. Then, the laser beams of S-polarized light are transmitted through the P-polarized light reflecting plate 512 of the first polarized light beam splitter 510, thereby being incident on the first photodiode 80 via the third beam splitter 51".

The optical function (except the light path changing procedure) when a BD or an AOD is used and the optical function when a DVD or a CD is used is substantially the same as those of the previously described exemplary embodiments and therefore a detailed description is not repeated.

As described above, according to the present invention, it is possible to provide an optical pickup of a simple construction, which is compatible with and can record and/or reproduce information on substantially all of the existing optical information recording mediums including BDs, AODs, DVDs, CDs, and the like. Therefore, it is possible to implement a multifunctional and inexpensive optical recording and reproducing appliance.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A compatible optical pickup comprising:
   a first light source unit for independently projecting first and second short-wavelength laser beams that have different polarizations but the same wavelength;
   a second light source unit for independently projecting first and second long-wavelength laser beams that have different wavelength-range;
   a first objective lens that has a high numerical aperture suitable for a high density optical information recording medium;
   a second objective lens that has a low numerical aperture suitable for a low density optical information recording medium; and
   a light path changing unit for guiding the first short-wavelength laser beams to the first objective lens and guiding the second short-wavelength laser beams, the first long-wavelength laser beams, and the second long-wavelength laser beams to the second objective lens;
   wherein the light path changing unit has polarization selectivity so that the light path changing unit reflects the first short-wavelength laser beams and transmits the second short-wavelength laser beams with different polarization from the first short-wavelength laser beams.

2. A compatible optical pickup as claimed in claim 1, wherein the numerical aperture of the first objective lens is not less than about 0.85 and the numerical aperture of the second objective lens is not more than about 0.65.

3. A compatible optical pickup as claimed in claim 2, wherein the short-wavelength is in the 400 nm-wavelength range, the first long-wavelength is in the 650 nm-wavelength range, and the second long-wavelength is in the 780 nm-wavelength range.

4. A compatible optical pickup as claimed in claim 3, wherein the high density optical information recording medium includes a BD, and the low density optical information recording medium includes an AOD, a DVD and a CD.

5. A compatible optical pickup comprising:
   a first light source unit for independently projecting first and second short-wavelength laser beams that have different polarizations;
   a second light source unit for independently projecting first and second long-wavelength laser beams that have different wavelength-range;
   a first objective lens that has a high numerical aperture suitable for a high density optical information recording medium;
   a second objective lens that has a low numerical aperture suitable for a low density optical information recording medium; and
   a light path changing unit for guiding the first short-wavelength laser beams to the first objective lens and guiding the second short-wavelength laser beams, the first long-wavelength laser beams, and the second long-wavelength laser beams to the second objective lens;
   wherein the first light source unit comprises a twin blue laser diode with a first blue laser diode for projecting first short-wavelength laser beams of P-polarized light and a second blue laser diode for projecting second short-wavelength laser beams of S-polarized light.

6. A compatible optical pickup as claimed in claim 5, wherein the first and second blue laser diodes are packaged as a single component.

7. A compatible optical pickup as claimed in claim 5, wherein the first and second blue laser diodes are arranged to have different angles with respect to the direction of an optical axis.

8. A compatible optical pickup as claimed in claim 7, wherein the first and second blue laser diodes are arranged at an angle of about 90 degrees with respect to each other.

9. A compatible optical pickup as claimed in claim 7, wherein the first and second blue laser diodes are arranged at an angle of about 45 degrees with respect to each other.

10. A compatible optical pickup as claimed in claim 5, wherein the second light source unit comprises a twin laser diode with a first laser diode that projects the first long-wavelength laser beams and a second laser diode that projects the second long-wavelength laser beams.

11. A compatible optical pickup as claimed in claim 10, wherein the first and second laser diodes are packaged as a single component.

12. A compatible optical pickup as claimed in claim 10, wherein the light path changing unit comprises:
- a beam splitter that splits the short-wavelength laser beams projected from the first light source unit by reflecting and transmitting the short-wavelength laser beams, and transmits the laser beams reflected from an optical information recording medium;
- a first collimating lens that focuses the short-wavelength laser beams reflected by the beam splitter into parallel beams;
- a second collimating lens that focuses the long-wavelength laser beams projected from the second light source unit into parallel beams;
- a polarized light beam splitter that transmits P-polarized light and reflects S-polarized light in the laser beams focused by the first collimating lens, so that S-polarized light is incident on the second objective lens, the polarized light beam splitter transmitting the long-wavelength laser beams focused by the second collimating lens so that long-wavelength laser beams are incident on the second objective lens; and
- a reflecting mirror for changing the path of the P-polarized light transmitted through the polarized light beam splitter toward the first objective lens.

13. A compatible optical pickup as claimed in claim 12, further comprising first and second grating lenses that split the laser beams projected from the first and second light source units, respectively, into main beams and sub beams.

14. A compatible optical pickup as claimed in claim 13, further comprising an optical detection unit for receiving light reflected from an optical information recording medium and outputting a disc information reproducing signal and signals for focusing and tracking.

15. A compatible optical pickup as claimed in claim 14, wherein the optical detection unit comprises a first photodiode for receiving light reflected from the high density optical information recording medium, and a second photodiode for receiving light reflected from the low density optical information recording medium.

16. A compatible optical pickup as claimed in claim 15, wherein the second grating lens and the second photodiode are integrally formed with the second light source unit, and the second light source unit includes a holographic optical device for diffracting the light reflected from the low density optical information recording medium to the second photodiode.

17. A compatible optical pickup as claimed in claim 16, further comprising a third photodiode for receiving light projected from the first light source unit and transmitted through the beam splitter and outputting a signal for tuning the intensity of laser beams.

18. A compatible optical pickup as claimed in claim 10, wherein the light path changing unit comprises:
- a first polarized light beam splitter having an S-polarized light reflecting plate that transmits P-polarized light and reflects S-polarized light in the short-wavelength laser beams projected from the first light source unit, and a P-polarized light reflecting plate that reflects P-polarized light and transmits S-polarized light, so that the S-polarized light is incident on the second objective lens and the first and second long-wavelength laser beams projected from the second light source unit are also incident on the second objective lens;
- a second polarized light beam splitter having a P-polarized light reflecting plate that makes the P-polarized light that has been transmitted through the first polarized light beam splitter incident on the first objective lens, and an S-polarized light reflecting plate that transmits P-polarized light and reflects S-polarized light;
- first and second collimating lenses arranged between the first polarized light beam splitter and the second objective lens, and between the second polarized light beam splitter and the first objective lens, respectively, to collimate incident light; and
- first and second wavelength plates arranged between the first collimating lens and the second objective lens, and between the second collimating lens and the first objective lens, respectively, to transform the polarization of the short-wavelength laser beams respectively reflected from the optical information recording medium.

* * * * *